Feb. 2, 1971   R. STALP   3,560,840
VOLTAGE REGULATOR FOR A GENERATOR WITH FILTERED FEEDBACK MEANS
Filed June 4, 1968
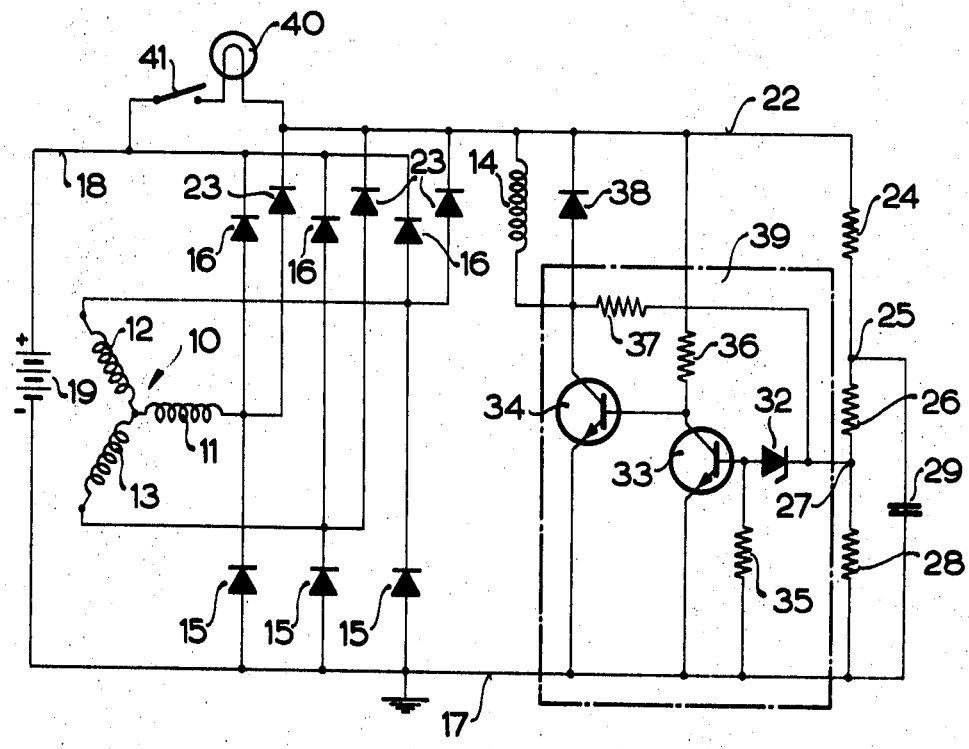
INVENTOR
Rudi STALP
By
his ATTORNEY

United States Patent Office 3,560,840
Patented Feb. 2, 1971

3,560,840
VOLTAGE REGULATOR FOR A GENERATOR WITH FILTERED FEEDBACK MEANS
Rudi Stalp, Korntal, Germany, assignor to Robert Bosch G.m.b.H., Stuttgart, Germany, a limited-liability company of Germany
Filed June 4, 1968, Ser. No. 734,459
Claims priority, application Germany, June 9, 1967, B 92,925
Int. Cl. H02p 9/30
U.S. Cl. 322—28                                    3 Claims

ABSTRACT OF THE DISCLOSURE

To enable use of integrated circuits, a field current transistor, being switched between conductive and blocked condition, controls the total supply of energy to the generator field; a control transistor is connected to the field current transistor to control its conduction, and a positive feedback circuit interconnects the two transistors for rapid on-off switching. The extent of conduction, as determined by the control transistor, depends on deviation of generator output voltage from a reference, for example a Zener diode. To prevent response of the control transistor to harmonics, a voltage divider with two taps is connected across the output, a capacitor being connected from one tap across the voltage divider to span another tap, and the reference voltage being taken off the other tap, so that the capacitor can act as a smoothing, or filtering capacitor, the resistance between the taps isolating the capacitor and the reference point of the voltage, and hence the feedback circuit, to provide for rapid response to output voltage variations.

---

The present invention relates to a voltage regulator for a generator, and particularly for an automotive type alternator, and having a field winding connected to be supplied with current from the generator.

Voltage regulators utilizing a switching transistor, interrupting current through the field winding of a generator in accordance with variaitons of output voltage of the generator, with respect to a reference diode, such as a Zener diode, have previously been proposed. The conduction of the switching transistor itself is controlled by a second transistor. A positive feedback circuit is provided from the field switching transistor to the control transistor to provide for rapid and positive on-off switching. German Pat. 1,053,628, assigned to the asignee of the present invention, discloses a voltage regulator having a positive feedback circuit including a resistance, in which a pair of coupled transistors are switched between blocked, and conductive condition in dependence on a control potential. The circuit of that particular patent requires a number of voltage reference diodes, and thus a comparatively large number of parts.

British Pat. 1,043,589, also assigned to the assignee of the present invention, discloses a circuit utilizing a single Zener diode, connected to a voltage divider which is connected across the potential to be regulated. The input to the voltage divider requires, however, a choke in order to filter out harmonics, or ripples which are particularly prevalent in automotive type alternators. It is difficult to combine such a choke with an integrated circuit.

It is the object of the present invention to provide a voltage regulator or control circuit which does not require any inductive elements, and which can be constructed as an integrated circuit.

SUBJECT MATTER OF THE PRESENT INVENTION

Briefly, in accordance with the present invention, a field current transistor is connected in series with the field winding of the generator, for example a three-phase automotive type alternator. The conduction of the emitter-collector path of the field current transistor is controlled by a control transistor, having its output connected to the base of the field current transistor. A Zener diode is connected to the input, that is to the base, of the control transistor to determine its conduction with respect to change in output voltage of the generator, as determined by the voltage across a tap point of a voltage divider, connected across the output of the generator. A positive feedback circuit interconnects the collector of the field current transistor and the input of the control transistor, to effect rapid change over between blocking and conductive condition of the field control transistor.

According to the invention, a capacitor is connected across a tap point of the voltage divider which spans the tap piont of the voltage divider which spans the tap point of the connection of the Zener diode, and hence one terminal of the feedback circuit. The portion of the voltage divider between the connection of the condenser, and the tap point to which the feedback circuit, and hence the Zener diode, are connected, forms an isolating resistance with respect to the condenser, so that the condenser can effectively provide smoothing of ripple, or harmonic frequencies of the output of the generator, without interfering with rapid response of the feedback circuit to changes in output voltage of the generator. Since the circuit requires, as components, only resistances, capacitors, and diodes or transistor elements, it can be constructed as an integrated circuit.

The structure, organization, and operation of the invention will now be described more specifically with reference to the accompanying drawings, wherein:

The single figure illustrates, in schematic form, a circuit in accordance with the present invention.

An alternator 10 has three armature windings, 11, 12, 13, and a rotating field 14, to generate three alternating currents, offset with respect to each other by 120 electrical degrees. A common chassis line 17 is connected over three rectifiers 15 with the armature windings, 11, 12, 13; three rectifiers 16 connect to a positive line 18, the rectifiers 15, 16, forming a bridge circuit. A battery 19 is connected across line 17, 18.

A pair of rectifiers 23, connected across armature windings 11, 13, are connected to a second positive line 22. Rectifiers 23, together with the three rectifiers 15, form a second bridge rectifier, so that the potential between lines 22 and 17 is about the same as that between 18 and 17.

A voltage divider formed of resistances 24, 26, 28 is connected across lines 22 and 17. The tap points of the voltage divider are formed by junctions 25 and 27. The voltage appearing at the tap points 25, 27 is thus a function of the output voltage of the generator. A smoothing condenser 29 is connected between junction 25 and chassis, that is line 17, to span the resistances 26, 28 of the voltage divider and the intermediate tap point 27 therebetween. Condenser 29 is so dimensioned that short-term voltage variations, such as harmonics and ripples occurring at the output of the generator 10, are smoothed out.

A Zener diode 32 has its cathode connected to tap point 27, and its anode to the base of an npn control transistor 33, as well as to a resistance 35 which is connected to chassis. The emitter of transistor 33 is likewise connected to the chassis line 17.

The collector of transistor 33 is connected to the base of a field current control resistor 34, the collector-emitter path of which is in series with the field winding 14 of the generator, and connected across lines 22 and 17. The collector of transistor 33 is further connected over a resistance 36 to the line 22. The collector of field current control transistor 34 is connected over a regenerative, positive feedback circuit formed by a resistance 37 to the tap point 27 of the voltage divider. A diode 38 is connected in parallel to the field winding 14.

The circuit elements 32–37, enclosed within the chain-dotted line 39, all are resistances and semiconductor elements which may be formed as a single integrated circuit.

An ignition switch 41, in series with a charge indicator control lamp, is connected between line 22 and positive bus 18.

Operation

If the voltage of generator 10 is too low, then the voltage at tap 27 is so low that Zener diode 32 is blocked and transistor 33 has no base current applied thereto. Transistor 33 will, therefore, also be blocked. The collector of transistor 33 then has a positive potential with respect to chassis line 17. Transistor 34 will have a base current flowing therethrough, and thus will become conductive, and current will flow from line 22 through field coil 14. This will increase the output voltage of the generator 10.

The collector of transistor 34 then has, approximately, the potential of negative line 17. This will have the practical effect to connect resistance 37 in parallel between tap 27 of the voltage divider and chassis, further reducing the voltage across resistance 28 of the voltage divider formed of resistances 24, 26, 28, thus securely blocking control transistor 33 and Zener diode 32. Upon increase of output voltage of generator 10, the voltage at the tap 27 will eventually become so positive that Zener diode 32 will become conductive and base current will flow in transistor 33. As soon as base current flows in transistor 33, it will become conductive, and its collector current will increase, thus decreasing the base current of transistor 34. This increases the voltage at the collector of transistor 34 in a positive direction, until it reaches approximately the voltage of line 22. Thus, resistance 37 is now in effect in parallel between tap 27 and line 22, that is in parallel with resistances 24, 26, causing an increase in the voltage at tap 27, for example in the amount of 0.2 v. This further contributes to cause Zener diode 32 to become fully conductive, transistor 33 has full base current flowing therethrough and thus it also becomes fully conductive, completely blocking transistor 34.

Resistance 37 thus acts as a positive feedback circuit causing rapid switching of transistor 34 between its blocked and conductive states. This enables higher loading of transistor 34, since the losses therein are comparatively small only when it is controlled to be in its saturated condition, that is completely conducting its maximum rated current.

Blocking of transistor 34 causes an exponential decrease in the current through field 14. This current can continue to flow through diode 38. Nevertheless, the output voltage of generator 10 will decrease.

Condenser 29 enables full use of the positive feedback circuit formed by resistance 37. Transistor 34 will switch between conductive and blocked state from between 10 to 100 times per second, depending on the loading on generator 10. The voltage at tap point 27 will change in synchronism with this switching frequency of the transistor. If condenser 29 would be connected between tap 27 and chassis, condenser 29 would have the effect to smooth-out the changes of potential at resistance 28. By connecting the condenser 29 to tap 25, however, so that resistance 26 will be interposed between taps 25 and 27, the voltage at tap 27 may change in the above described manner, thus permitting the positive feedback circuit, that is resistance 37, to be fully effective. Nevertheless, ripple and harmonic frequencies of the generator are filtered.

The switching frequency of the voltage regulator can be adjusted by suitable choice of resistances 26 and 37, with respect to the value of condenser 29. Excessively high switching frequencies can thus be avoided. If the switching frequency is too high, losses increase and the regulating effectiveness is decreased. Such excessively high switching frequency may arise particularly when the regulator is used with three-phase alternators, having output voltages rich in harmonics and ripple frequencies.

The connection from control transistor 33 to field current transistor 34 need not be direct; additional amplification, for example formed by one or more transistors, may be used in the connecting link. If desired, the feedback circuit including resistance 37 may then interconnect not only the field current transistor but also such additional amplification transistor, as well known in the art, to affect the switching of both the field current transistor and such amplification transistor. Diodes may be included in the circuit to prevent spurious responses. Such additional transistor and other semiconductor components are preferably included in the integrated circuit 39.

What is claimed is:
1. In an automotive-type voltage regulator for connection to an automotive three-phase generator (10) having an excited field winding (14), and a semiconductor-type three-phase full wave rectifier connected to said generator and providing a regulated D–C output voltage:
   a field current transistor (34) connected in the circuit of said field winding and conducting either in saturated condition, or being cut off, the conduction period of said field current transistor (34) determining the energy being applied to said field; a control transistor (33) connected to the input of said field current transistor (34) to control the state of conduction thereof between saturation and cut-off; and a regenerative feedback circuit including a feedback coupling resistance (37) interconnecting the field current transistor and the control transistor;
   the improvement comprising the combination of:
   a voltage divider (24, 26, 28) comprising a plurality of resistances connected across the output of said semiconductor type three-phase rectifier and being supplied by direct current derived therefrom;
   a smoothing condenser (29) connected (25, 17) across some of the resistances (26, 28) forming said voltage divider;
   a tap point (27) on said voltage divider intermediate the connection points (25, 17) of said condenser (29) and always separated from said connection points by resistances, which separating resistances form part of said voltage divider;
   voltage-sensitive means (32) connected (27) to said tap point and to the input of said control transistor (33) to control its conduction in accordance with deviation of said generator output voltage from a predetermined value;
   and means coupling said feedback coupling resistance (37) and the output circuit of said field current transistor (34) to said tap point (27) on said voltage divider;
   thereby providing for rapid response of said field current transistor (34) to changes in output voltage, so that said field current transistor (34) will operate, when conducting, in saturated condition while isolating the feedback circuit including said feedback resistance (37) from commutating peaks caused by said semiconductor-type rectifier.

2. Regulator according to claim 1 wherein said field current transistor (34) has its emitter-collector path connected in series with said field winding (14) and said feedback coupling resistance (37) interconnects the collector of the field current transistor (34) and said tap point (27).

3. Regulator according to claim 1 wherein said voltage sensitive means (32) is a Zener diode and the field current transistor (34), said control transistor (33) and said Zener diode, as well as said feedback coupling resistance (37) is formed by an integrated circuit (39).

References Cited

UNITED STATES PATENTS

| 3,056,913 | 10/1962 | Henderson et al. | 322—73X |
| 3,366,870 | 1/1968 | Hemmenway et al. | 322—28X |
| 3,439,255 | 4/1969 | Carnes et al. | 322—28 |

MILTON O. HIRSHFIELD, Primary Examiner

H. HUBERFELD, Assistant Examiner

U.S. Cl. X.R.

322—58, 73